United States Patent [19]

Saijo et al.

[11] Patent Number: 4,825,241
[45] Date of Patent: Apr. 25, 1989

[54] ELECTROSTATIC LATENT IMAGE DEVELOPING APPARATUS

[75] Inventors: Hiromitsu Saijo, Toyokawa; Hiroshi Ikeda; Masamichi Hayashi, both of Aichi; Shinya Matsuda, Toyokawa, all of Japan

[73] Assignee: Minolta Camera Kabushiki Kaisha, Osaka, Japan

[21] Appl. No.: 73,710

[22] Filed: Jul. 14, 1987

[30] Foreign Application Priority Data

Jul. 16, 1986 [JP] Japan .................................. 61-168959

[51] Int. Cl.4 .......................................... G03G 15/09
[52] U.S. Cl. .................. 355/3 DD; 118/657
[58] Field of Search ................ 355/3 DD, 4; 118/645, 118/648, 651, 657, 658

[56] References Cited

U.S. PATENT DOCUMENTS

| 4,297,970 | 11/1981 | Tajima et al. | 118/658 X |
| 4,391,512 | 7/1983 | Nakamura et al. | 118/658 X |
| 4,436,413 | 3/1984 | Oka | 355/3 DD X |
| 4,492,456 | 1/1985 | Haneda et al. | 355/3 DD |
| 4,511,239 | 4/1985 | Kanbe et al. | 355/3 DD |

Primary Examiner—Fred L. Braun
Attorney, Agent, or Firm—Burns, Doane, Swecker & Mathis

[57] ABSTRACT

An electrostatic latent image developing apparatus includes a rotatable developing sleeve, multiple fixed magnets provided in the developing sleeve and a brush-height regulating member provided opposite to the developing sleeve. One of the multiple magnets, which is provided opposite to the brush-height regulating member, is magnetized so that the region corresponding to 80% and more of the peak value in the magnetic force distribution curve of the magnet has a spread with a central angle of 20° or greater on the exterior surface of the developing sleeve.

3 Claims, 3 Drawing Sheets

ELECTROSTATIC LATENT IMAGE DEVELOPING APPARATUS

BACKGROUND OF THE INVENTION

The present invention relates to a developing apparatus employing a magnetic brush developing method.

A conventional mode of the aforesaid developing apparatus provides a developer which is supplied to the surface of a developing sleeve by means of a dispersing roller, said developer being maintained as a magnetic brush by the magnetic intensity of a magnetic roller, the developer being carried to an area opposite (in the developing region) a photosensitive drum via the rotation of a developing sleeve, with the head of the magnetic brush being trimmed by a brush-height regulating member, thus appropriately maintaining the volume of the developer which is carried to the developing region.

Although the magnetic brush formed above the aforesaid developer sleeve becomes thin as it rises in the direction of the normal line along the line of magnetic force opposite the magnetic pole, it overlaps and reaches a high density along the exterior surface of the developing sleeve between the magnetic poles.

Thus, because the volume of developer which is allowed to pass varies greatly with even a slight adjustment error in the positioning of the brush-height regulating member when the leading edge of the brush-height regulating member is provided opposite the thick portion of the magnetic brush, said brush-height regulating member is generally provided opposite the thin portion of the magnetic brush so as to control the volume of carried developer in this area.

The aforesaid developing apparatus possesses the disadvantages hereinafter described.

The magnetic brush becomes abruptly low and thick at a point where there is a slight shifting of position because the range wherein the aforesaid developer becomes thin is exceedingly narrow. When this thick portion of the magnetic brush acquires carrier capability from the developing sleeve, the thin portion of the brush which faces the brush regulating member is depressed and the thin condition is broken.

Therefore, in order to alleviate this type of magnetic brush break down and achieve a proper developer carrier volume, the brush-height regulating gap must necessarily be narrow and adjustment becomes exceedingly difficult.

A concrete numerical example of the aforementioned situation follows. Generally, in giving consideration to factors such as mass production, cost and production technology, the permissible error at the time of assembly becomes a problem at less than ±0.05 mm. However, when the necessary brush-height regulating gap is relatively small, for example, Db=0.45 mm, the difference between the upper limit of 0.50 mm and the lower limit of 0.40 mm (e.g., said difference being 0.1 mm) is approximately 22% of the brush-height regulating gap (0.45 mm). When a difference of this magnitude obtains in conventional developing apparatuses, the developing characteristics change markedly, tone reproducability is reduced, and the image becomes hard.

A second disadvantage is that an error of ±2° in the positioning accuracy of the magnets provided to the magnetic roller occurs circumferentially from the standpoint of structural assembly, and furthermore, even whenever the magnetic roller is mounted to the developing sleeve and incorporated in a developing apparatus, the same degree of error (±2°) unavoidably occurs.

Thus, when a developing sleeve having a major diameter of 25 mm is used, for example, and the aforesaid error is produced, the position of the magnet center shifts nearly ±0.9 mm circumferentially on the surface of the developing sleeve.

$$[8°/360°)33\ 25\ mm \times \pi = 0.89\ mm]$$

Accordingly, when a 2 mm thick sheet metal part is used as the brush-height regulating member and the adjustment position shifts only to the degree described above, the volume of carried developer will change greatly. For example, when the volume of carried developer increases, the developer clogs between the photosensitive drum and the developing sleeve resulting in inferior image quality and damage to the expensive photosensitive drum, and the drive system becomes overloaded due to increased torque which likewise results in damage to the drive system.

A third disadvantage is that because the previously described brush-height regulating gap is essentially very narrow, when developer, paper or other debris aggregate therein causing a narrowing of said regulating gap, the developer ceases to pass only at that section, producing linear whiteouts on the copy image and resulting in damage to the surface of the developing sleeve.

SUMMARY OF THE INVENTION

The principal object of the present invention is to provide a developing apparatus capable of producing high quality images.

A further object of the present invention is to provide a developing apparatus wherein adjustment error in the brush-height regulating member has a minimal effect.

A still further object of the present invention is to provide a developing apparatus which is unlikely to produce poor image quality.

The inventors compiled the results of various studies to realize the aforesaid objects and discovered that the magnetic pole of the area opposite the brush-height regulating member gradually changes in the vicinity of the peak value for the distribution of magnetic intensity which emanates therefrom, and when the area of high magnetic intensity is distributed over a wide region, the thin developer range became greater, and it was possible to alleviate the fluctuation in the volume of carried developer which accompanies the shift in the brush-height regulating member position and the magnetic brush break down induced by the thick developer. It was also discovered that the effects of adjustment error could be reduced by increasing the brush-height regulating gap.

These and other objects are achieved by an electrostatic latent image developing apparatus which comprises a developing sleeve provided opposite to a latent image holding member, magnet means mounted within said developing sleeve and having multiple poles along the surface of said developing sleeve, and a brush-height regulating member provided opposite said developing sleeve, wherein the developer which is supplied to the surface of said developing sleeve is maintained in a magnetic brush state, and the volume of the developer carried to the developing region at the aforesaid brush-height regulating member via the rotation of said developing sleeve is regulated, the developing apparatus being characterized by the leading edge of the aforesaid brush-height regulating member being provided opposite one of the poles of the magnet means, one of said poles being magnetized so that the region corresponding to 80% and more of the peak value in the magnetic force distribution curve of said pole has a spread with a central angle of 20° or greater on the exterior surface of the developing sleeve.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE INVENTION

The present invention is hereinafter described with reference to the appended drawings.

Figure 1:
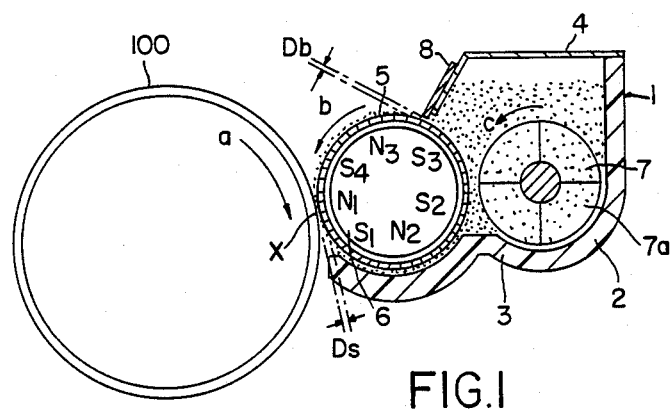
FIG. 1 is a cross sectional view of a developing apparatus related to the present invention.

In FIG. 1, item 100 is the photosensitive drum, said photosensitive drum 100 having a photosensitive layer provided on its surface and being capable of rotational actuation in the direction indicated by the arrow marked (a) via a driving means not shown in the drawing. A charging means not shown in the drawings is provided at the exterior surface so as to charge said exterior surface with a negative polarity.

Item 1 is a developing apparatus related to the present invention, said developing apparatus 1, in brief, comprising a developing tank 2 formed by a casing 3 made from an antimagnetic material and a cover 4, said developing tank 2 having, from the photosensitive drum 100 side, a developing sleeve 5 and a dispersing roller 7 provided therein.

Developing sleeve 5 is a cylindrical aluminum member having minute surface irregularities of 5–10μ provided thereon by means of a blasting process and having a magnetic roller 6 mounted therein with the photosensitive drum 100 provided opposite and with a developer gap Ds provided therebetween, said developing sleeve 5 being rotated in the direction indicated by arrow (b) via a driving means not shown in the drawing.

The leading edge of brush-height regulating member 8, which is made of a 2 mm thick brass member mounted to the front of cover 4, is provided in apposition, to the rear and at an angle above developing sleeve 5 in relation to the photosensitive drum 100, a brush-height regulating gap Db being provided mesially to said edge of regulating member 8 and developing sleeve 5.

Magnetic roller 6 has multiple magnets with axially oriented poles provided around its circumference, said magnetic poles positioned on the exterior surface being provided as shown in FIG. 1, particularly having magnetic pole $N_1$ provided opposite said photosensitive drum 100, pole $S_3$ opposite the leading edge of brush-height regulating member 8, and magnetic poles $S_2$ and $S_3$ having identical polarities being provided adjacently and opposite dispersing roller 7, said magnetic poles forming a nonmagnetic region therebetween.

Figure 2:
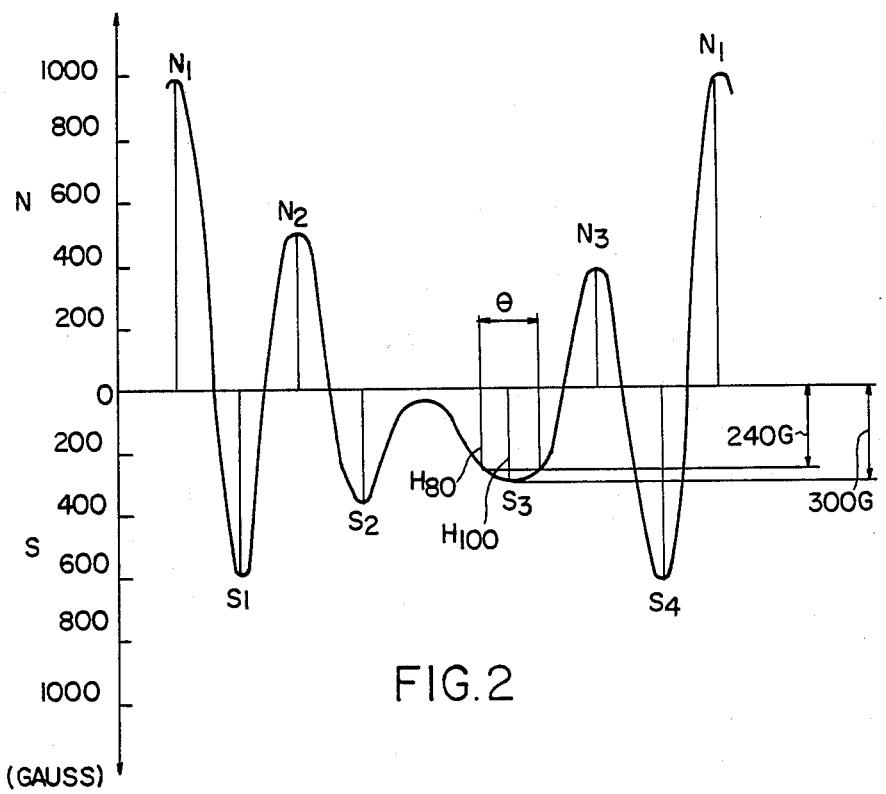
FIG. 2 is a diagram showing the distribution of magnetic intensity for a magnetic roller related to the present invention.

The magnetic intensity of each of these poles is set as shown in FIG. 2. The peripheral magnetic intensity of the magnetic pole $S_3$ opposite the brush-height regulating member 8 reaches a peak value $H_{100}$ of 300 G, and the region $\theta$ having a magnetic intensity 80% of said peak value ($H_{80}=240$ G) is fixed so as to be at 20° or higher in regard to a 360° circumference.

When the magnetic intensity is 80% or more of the peak value, the magnetic lines of force produced from magnetic pole $S_3$ rise virtually to the normal line thereby allowing the magnetic brush to become thin.

Dispersing roller 7 provides multiple dispersion blades 7a, and is rotationally actuated in the direction indicated by arrow (c) via a driving means not shown in the drawing.

The operation of a developing apparatus 1 of the aforesaid construction is hereinafter described.

A bicomponent developer comprising a mixture of a negatively charged magnetic carrier and a positively charged nonmagnetic toner is held in a developing tank 2.

The aforesaid developer is mixed and dispersed via the rotation of dispersion roller 7, the carrier and toner have friction contact and the toner becomes adequately charged.

Then, when the developer is carried by the dispersion blades 7a and supplied to the surface of developing sleeve 5, it is magnetically maintained along the magnetic lines of force of magnetic roller 6, thus forming a magnetic brush, and is carried in the direction indicated by the arrow (b) via the rotation of developing sleeve 5.

Figure 3:
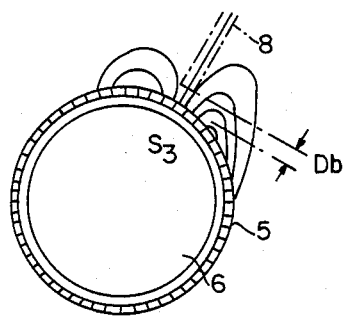
FIG. 3 is a diagram showing the magnetic lines of force for the area opposite the brush-height regulating member of the magnetic roller.

The developer is supplied from the region at the center of magnetic pole $S_3$ but close to magnetic pole $S_2$, and because the magnetic lines of force at said region subside crossing the exterior surface of developing sleeve 5 as shown in FIG. 3, the developer is carried along said path in a thick state.

Then, when the developer reaches the region opposite the brush-height regulating member 8, the local magnetic line of force rises virtually in the direction of the normal line over a wide range becomes thin. Accordingly, developer is carried along this region in a thin state.

Thereafter, when the developer reaches the area opposite the brush-height regulating member 8, the head is trimmed by said brush-height regulating member 8 and excess developer is prevented from passing from the tank 2 to the drum 100.

At this time, because the developer is thin over a wide range at the upstream side of the brush-height regulating member 8 as previously described, the break down of the magnetic brush induced by the thick developer positioned upstream does not extend as far as the brush-height regulating member 8, and the rising magnetic brush can be reliably trimmed.

The developer which passes opposite the brush-height regulating member 8 is carried continuously in the direction indicated by the arrow (b), and when said developer reaches developing region X it rubs the surface of the photosensitive drum 100 and the toner forms an image corresponding to the electrostatic image formed on the surface of said photosensitive drum 100 via a charging means and exposure means which are not shown in the drawings.

The toner image thus formed on the surface of the photosensitive drum 100 is transferred to the copy paper in a transfer process not shown in the drawings, and thereafter said copy paper undergoes a fixing process and is ejected.

The toner is consumed in the developing region X, and the reduced-concentration developer is continuously carried in the direction indicated by the arrow (b) reaching the area opposite the dispersion roller 7, and is separated from the developing sleeve 5 in the nonmagnetic region medial to magnetic poles $S_2$ and $S_3$.

Then, the developer is resupplied to the surface of the developing sleeve 5.

The aforesaid developing apparatus 1 is provided and a copy process conducted under the conditions hereinafter described.

(1) Conditions
* Photosensitive drum 100
  Major diameter: 50 mm
  Peripheral speed: 85 mm/s
* Developing sleeve 5
  Major diameter: $\theta$ 24.5 mm
  Peripheral speed: 85 mm/s
  Developing gap Ds: 0.5 mm
  Toner mix rate: 7 wt %
* Brush-height regulating gap Db: 0.40-0.75 mm
* Magnetic roller 6
  Region wherein magnetic intensity is $H_{80}$ or greater ($\theta$): 16°-37°

(2) Results

In experiments performed under the aforesaid conditions, the developer was observed to rise virtually to the normal line and become thin in the area where magnetic intensity was $H_{80}$.

Then, using a grey scale manufactured by Eastman Kodak Co., developer characteristics were studied with the results described hereafter.

(i) When the region wherein magnetic intensity is $H_{80}$ or greater was set at ($\theta$)=20°, the brush-height regulating gap Db was set at 0.55 mm and optimum developing characteristics were obtained with the maximum image density of the copy being I.D=1.3 or greater, and the solid image was accurately reproduced. Also, the tone was satisfactory to the eighth step, the half-tone image and blind spot image were accurately reproduced, and fog caused by carrier adhesion to the copy was not observed.

When the brush-height regulating gap Db was widened to 0.60 mm, the maximum image density and fog aspects were identical to those of the aforesaid Db=0.55 mm levels, while the tonal quality was satisfactory to the seventh step and satisfactory image characteristic were obtained.

With the brush-height regulating gap Db narrowed to 0.50 mm, there were no development problems although there was a reduction in maximum image density; the tonal quality and fog aspects were identical to those of the Db=0.60 mm levels.

One thousand copies were made under conditions of normal temperature and humidity and no developer clogging occurred.

Identical results were obtained when tests were conducted under high (30° C. and 85% humidity) and low (10° C. and 15% humidity) temperature conditions.

(ii) When the region wherein magnetic intensity is $H_{80}$ or greater was set at ($\theta$)=23°, the brush-height regulating gap Db was set at 0.65 mm and optimum developing characteristics were obtained with the maximum density of the copy image being I.D=1.3 or greater, the tone was satisfactory to the eighth step, and the solid image, half-tone image, and blind spot image were accurately reproduced, while no fog was observed.

With the brush-height regulating gap Db widened to 0.70 mm, identical developing characteristics were obtained regarding the aspects of tone and fog as for the aforesaid Db=0.65 mm setting, although the maximum image density was increased to I.D=1.35-1.40.

When the brush-height regulating gap Db was narrowed to 0.60 mm, no problem occurred with developing, and the aspects of tone and fog were identical with those of the Db=0.65 mm setting, although the maximum image density decreased (I.D=1.22).

The same results were obtained even when the environmental conditions were changed.

(iii) When the region wherein magnetic intensity is $H_{80}$ or greater was set at ($\theta$)=34°, the brush-height regulating gap Db was set at 0.70 mm and optimum developing characteristics were obtained with the maximum density of the copy image being I.D=1.3 or greater, the tone was satisfactory to the eighth step, and the solid image, half-tone image, and blind spot image were accurately reproduced; no fog was observed.

With the brush-height regulating gap Db widened to 0.75 mm, developing characteristics in regard to tone and fog were identical to those at the Db=0.70 mm setting, although the maximum image density increased to I.D=1.35-1.40.

When the brush-height regulating gap Db was narrowed to 0.65 mm, no development problems occurred and tone and fog aspects were identical with those at the Db=0.70 mm setting, although the maximum copy density was reduced (I.D=1.25).

The same results were obtained even when the environmental conditions were changed.

(iv) When the central angle ($\theta$) was set at 14° for the region wherein magnetic intensity is $H_{80}$ or greater, the brush-height regulating gap Db was set at 0.45 mm and optimum developing characteristics were obtained with the maximum density of the copy image being I.D=1.3 or greater, the solids were accurately reproduced, and the tone was satisfactory to the eighth step; the half-tone image and blind spot image were also accurately reproduced.

When the brush-height regulating gap Db was widened, however, the tonal quality was gradually lost. At Db=0.50 mm, tonal quality was satisfactory to the fifth step, image quality hardened, carrier adhered to the copy and fog was produced.

Also, when the brush-height regulating gap Db was narrowed, maximum copy density was reduced and only faint image reproduction was obtained. When Db was set at 0.40 mm, the normal line copy was lost and could not be read.

The brush-height regulating gap Db applicable range was confirmed to be 0.42-0.48 mm by means of tests performed under the aforementioned external environmental conditions of high and low temperatures.

Figure 5:
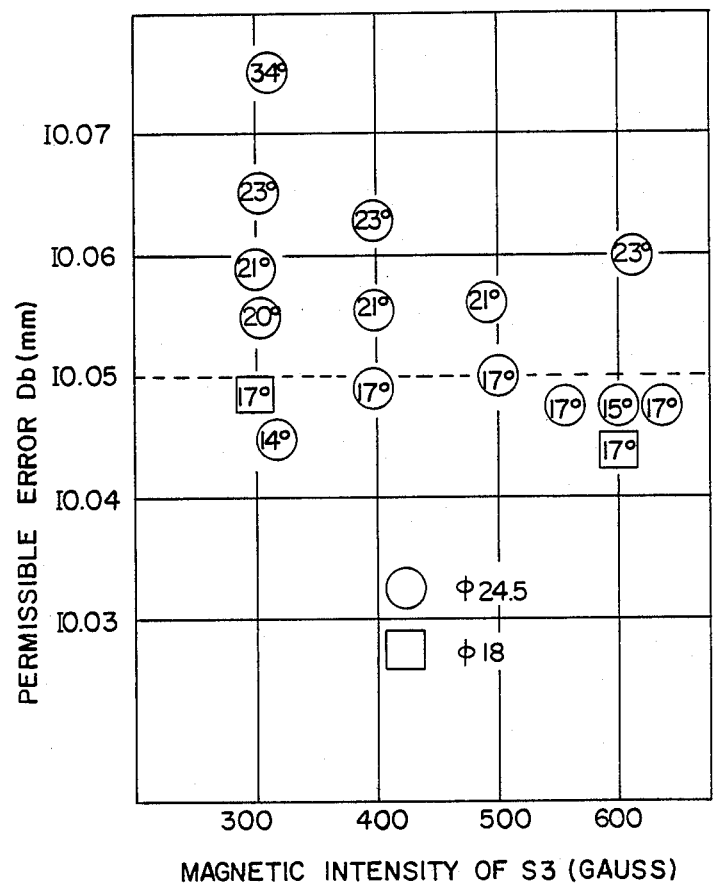
FIG. 5 is a graph showing the relationship between magnetic distribution and permissible error for the brush-height regulating gap.

Next, tests were conducted of developing apparatus 1 with various changes made in the settings of the brush-height regulating member 8, the peak value for the opposite magnetic pole $S_3$, and the region ($\theta$) wherein the magnetic intensity is $H_{80}$ or greater, the results of which are shown in FIG. 5.

In the drawing, the O mark indicates that the diameter of developing sleeve 5 is 24.5 mm, the □ mark indicates that the diameter is 18 mm, and the numbers found within each mark indicate the value of the respective magnetic intensity region ($\theta$).

The horizontal axis, shows peak values, while the vertical axis shows the corresponding permissible error for the brush-height regulating gap Db within which limits adequate developing characteristics can be obtained.

As can be understood from the drawing, the permissible error increases the greater the magnetic intensity region ($\theta$) and is unrelated to the peak value of magnetic pole $S_3$; when the magnetic intensity region ($\theta$) is set at 20° or greater, the permissible error can be ±0.05 mm or more.

The results of the aforementioned experiments confirmed that when the region ($\theta$) wherein the magnetic intensity is $H_{80}$ or greater is widened to as much as 20°, the setting value of the brush-height regulating gap Db can be increased without developer clogging, and when the magnetic intensity region ($\theta$) is 20° or greater, the developing characteristics remain virtually unaltered even if the brush-height regulating gap Db is changed within a range of permissible error of ±0.05 mm, and copy images are obtained which are faultless in regard to maximum density, tonal quality and fog. Although not indicated in the aforesaid experiments, it was confirmed that satisfactory copy images are obtained even if the settings are made so as to distribute the $H_{90}$ (270 G) region at a range having a central angle of 20° or greater.

Figure 4:
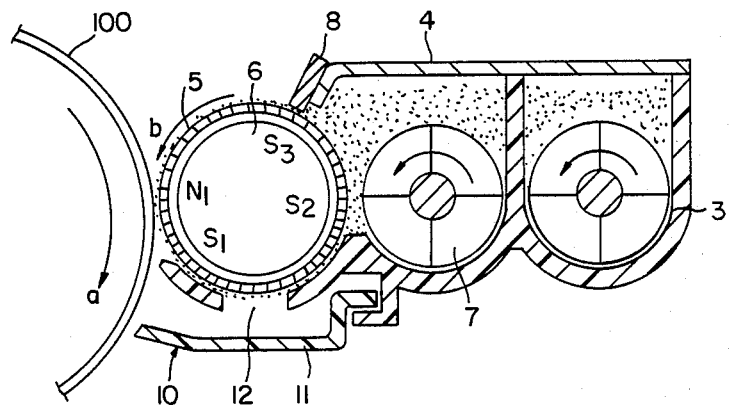
FIG. 4 is a cross sectional view showing variations of the developing apparatus of the present invention.

As shown in the developing apparatus in FIG. 4, it is also possible to provide a debris recovery device 10 comprising a slit 12 formed on the member opposite the bottom of developing sleeve 5 of casing 3, a container 11 being provided beneath said slit 12, whereby paper or component debris or other foreign matter contained in the magnetic brush can drop into and be held by container 11 via said slit 12.

If such a device is provided thereto, cleaning of the developer is facilitated, and production of low-charge toner, fogging and spotting can be prevented.

Also, foreign matter will not lodge between the brush-height regulating member 8 and the developing sleeve 5, nor will developing sleeve 5 incur damage from said foreign matter.

The provision of said device allows high quality copies to be obtained which are without fogging, spots or whiteouts.

As can be understood from the preceding explanation, a developing apparatus of the present invention comprising a brush-height regulating member provided with magnets, one of said magnets being so magnetized that the region corresponding to 80% and higher of the peak value in the magnetic force distribution curve of said magnet has a spread with a central angle of 20° or greater on the exterior surface of the developing sleeve.

Magnetic brush break down by the rising thin magnetic brush caused by the thick magnetic brush positioned upstream of the brush-height regulating member does not extend as far as the leading edge of the brush-height regulating member because the magnetic brush rises in the normal line direction over a wide area in the vicinity opposite said brush-height regulating member, thereby allowing the brush-height regulating gap to be set as wide as possible.

Thus, paper or component debris does not lodge between the developing sleeve and the brush-height regulating member, the developing sleeve and photosensitive drum are not damaged, and there is no overload of the driving system of said members.

Also, the effect of the brush-height regulating gap adjustment error on the image is minimized, there not being a large variation in image quality induced by a slight error, and even should there be some error in the positioning of the magnetic roller and the magnets provided therein, there is no loss of copy quality induced by said error because the rising width of the magnetic brush is still greater.

Thus, the assembly of said developing apparatus becomes simple.

Although the present invention has been fully described by way of examples with reference to the accompanying drawings, it is to be note that various changes and modifications will be apparent to those skilled in the art. Therefore, unless otherwise such changes and modifications depart from the scope of the present invention, they should be construed as being included therein.

What is claimed is:

1. An electrostatic latent image developing apparatus comprising;
   a rotatable developing sleeve provided opposite to a latent image bearing member;
   a brush-height regulating member made of non-magnetic material for regulating the volume of a developer carried to the developing portion opposite to the latent image bearing member; and
   magnet means for maintaining the developer on the surface of said developing sleeve in a magnetic brush state and having multiple poles along the surface of said developing sleeve, one of said poles being provided opposite to said brush-height regulating member and being magnetized so that the region corresponding to 80% and more of the peak value in the magnetic force distribution curve of said pole has a spread with a central angle of 20° or greater on the exterior surface of the developing sleeve.

2. An electrostatic latent image developing apparatus as claimed in claim 1, further comprising a debris recovery means for collecting debris contained in the magnetic brush and including a member for forming a slit opposite the bottom of said developing sleeve and a container provided beneath said slit.

3. An electrostatic latent image developing apparatus comprising;
   a rotatable developing sleeve provided opposite to a latent image bearing member;
   a brush-height regulating member made of non-magnetic material for regulating the volume of a developer carried to the developing portion opposite to the latent image bearing member; and
   magnet means for maintaining the developer on the surface of said developing sleeve in a magnetic brush state and having multiple poles along the surface of said developing sleeve, one of said poles being provided opposite to said brush-height regulating member and being magnetized so that the region corresponding to 80% and more of the peak value in the magnetic force distribution curve of said pole has a spread with a central angle of 23° or greater on the exterior surface of the developing sleeve.

* * * * *